United States Patent [19]

Higuchi

[11] Patent Number: 5,703,447
[45] Date of Patent: Dec. 30, 1997

[54] BATTERY VOLTAGE CONTROLLER FOR DC MOTOR

[75] Inventor: Yoshio Higuchi, Daito, Japan

[73] Assignee: Funai Electric Co., Ltd., Japan

[21] Appl. No.: 425,789

[22] Filed: Apr. 20, 1995

[30] Foreign Application Priority Data

Apr. 21, 1994 [JP] Japan .................. 6-004230 U

[51] Int. Cl.$^6$ ............................................. H02P 5/00
[52] U.S. Cl. ........................................ 318/139; 323/260
[58] Field of Search .................... 318/139, 140, 318/375, 376, 141, 430, 431, 432; 322/13, 14, 25, 28; 323/259, 660; 363/19, 21, 23, 25, 26, 102, 164, 174, 175, 59, 79, 89

[56] References Cited

U.S. PATENT DOCUMENTS 4,188,569  2/1980  Campbell .................. 318/375
5,270,625  12/1993  Lautzenhiser .............. 318/139 X
5,332,954  7/1994  Lankin ...................... 318/139
5,341,075  8/1994  Cocconi ..................... 318/139
5,500,579  3/1996  Kim et al. ................. 318/139 X

FOREIGN PATENT DOCUMENTS 4-263159  9/1992  Japan .
4-265691  9/1992  Japan .

Primary Examiner—Jonathan Wysocki
Attorney, Agent, or Firm—Bacon & Thomas

[57] ABSTRACT

A driver for driving a loading motor of a single-unit video camera-recorder. In the driver, a DC voltage supplied from a battery is boosted by a DC/DC converter, and the boosted DC voltage is supplied to the loading motor through a switch unit in which the polarity of the boosted DC voltage is switched.

5 Claims, 4 Drawing Sheets 5,703,447

BATTERY VOLTAGE CONTROLLER FOR DC MOTOR

BACKGROUND OF THE INVENTION

The present invention relates to a driver for driving a loading motor of a single-unit video camera-recorder or the like and, more particularly to a motor driver powered by a battery in which a DC voltage supplied from a battery is boosted and a boosted DC voltage is supplied to a motor as a drive voltage.

Drivers for driving a loading motor (simply referred to hereinafter as a motor) of a single-unit video camera-recorder have hitherto been requested to control the motor in such three ways as to deenergize or stop the motor and to rotate the motor in the positive and reverse directions.

FIG. 5 of the accompanying drawings shows in block form a switch unit of a conventional motor driver for controlling the motor in the above three ways.

As shown in FIG. 5, a switch unit 3 is mainly composed of four switches S1 through S4 connected in a bridge circuit fashion. The switches S1 through S4 are each formed of a transistor. When a command signal from a control unit 6 is supplied to the switch unit 3, the switch unit 3 opens connections of the four switches S1 through S4 to deenergize a motor 7. Moreover, the switch unit 3 closes connections of only the switches S1 and S3 to rotate the motor 7 in the positive direction, and also the switch unit 3 closes connections of only the switches S2 and S4 to rotate the motor 7 in the reverse direction.

The motor 7 is of the type whose winding has less number of turns because a battery 1 supplies a low operation voltage of 6V to the motor 7, the switch unit 3 outputs a lowered voltage and the motor 7 has to output a relatively large torque. Therefore, the motor 7 is driven at a very high rotational speed and is provided with a reduction unit 8 composed of reduction gears of a number of stages to transmit a power to a tape loading unit.

However, the motor 7 is driven at a very high rotational speed as described above and therefore the motor 7 generates much noise. Also, the noise is included in a high frequency range. Therefore, the noise generated by the motor 7 becomes very offensive to the ear.

The switch unit 3 is composed of the four switches S1 through S4 connected in a bridge circuit fashion in order to rotate the motor 7 in the positive and reverse directions. To this end, the motor 7 is connected through a pair of switches (S1 and S3 or S2 and S4) to the battery 1 so that the switch unit 3 has a large voltage drop ranging from 1.5 to 2V. Specifically, since the battery 1 supplies the operation voltage of 6V, the motor 7 has to be driven by a low operation voltage ranging from 4 to 4.5V, causing a current supplied to the motor 7 to increase. Therefore, it is unavoidable that the switch unit 3 suffers from a large loss of an electric power.

Further, since the motor 7 is driven at a high rotational speed, the number of stages of the reduction gears is increased to make the reduction unit 8 become complicated in arrangement. Moreover, the reduction unit 8 also generates large noise.

Furthermore, when the video tape is loaded by a tape loading unit, it takes a relatively long time, e.g., about 1 to 2 seconds for such a loading operation. Thus, the noise generated by the motor 7 and the reduction unit 8 becomes much more offensive to the ear.

SUMMARY OF THE INVENTION

In view of the aforesaid aspect, it is an object of the present invention to provide a motor driver powered by a battery in which the noise generated by a motor can be reduced and also the noise can be made inoffensive to the ear by using the motor that generates a predetermined output even when it is driven at a low rotational speed by a high operation voltage.

In attaining the above object, the present invention provides a driver for driving a loading motor of a single-unit video camera-recorder, including: a battery; a DC/DC converter for boosting a DC voltage supplied from the battery; a switch unit for switching a polarity of the DC voltage boosted by the DC/DC converter; and a loading motor to which the boosted DC voltage from the DC/DC converter is supplied through the switch unit, the loading motor being provided with a reduction unit for reducing a rotational speed of the loading motor at a predetermined reduction ratio.

DETAILED DESCRIPTION OF THE PREFERRED EMBODIMENT

A motor driver powered by a battery according to an embodiment of the present invention will hereinafter be described with reference to the drawings.

Figure 1:
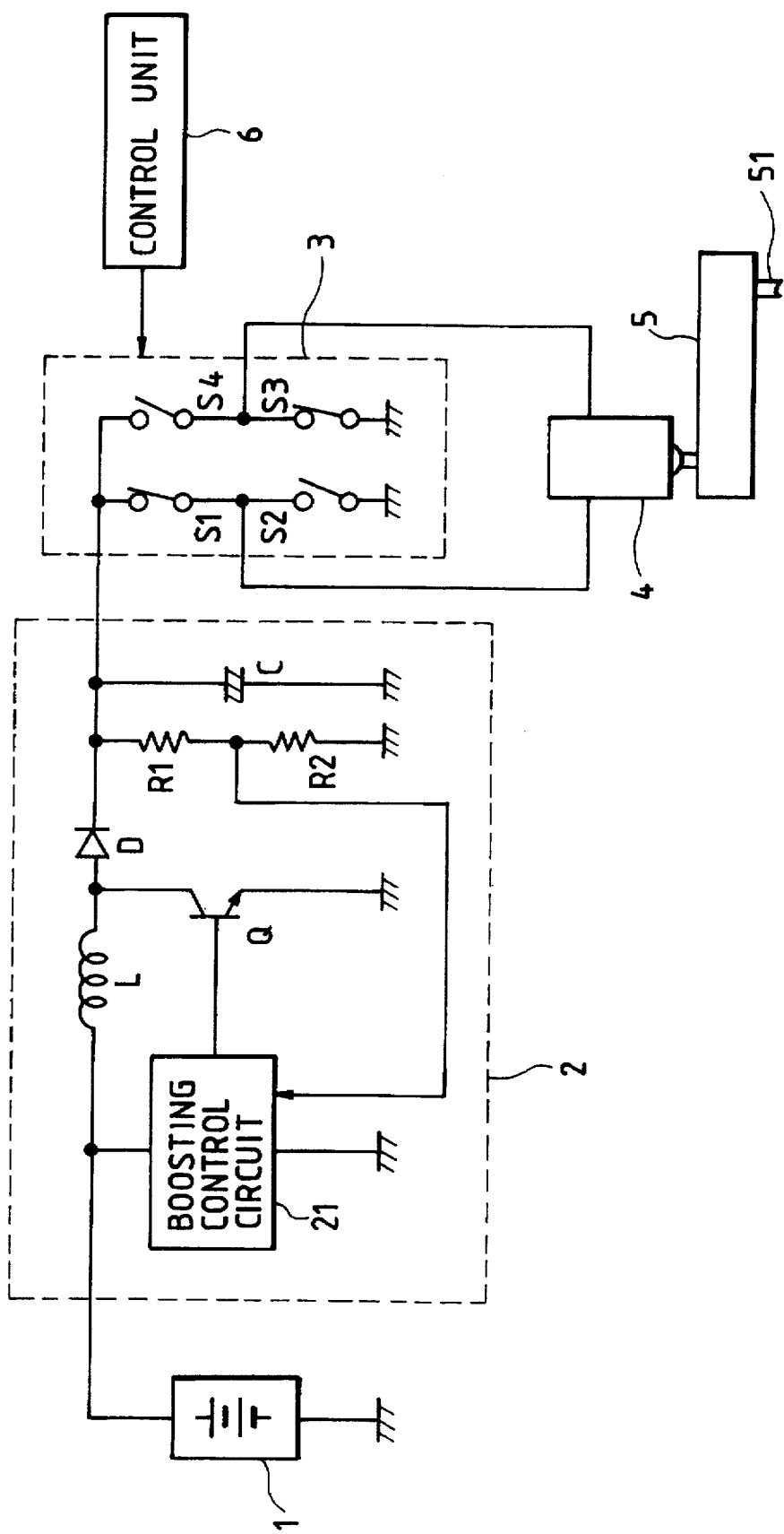
FIG. 1 is a block diagram showing an electrical arrangement of a motor driver powered by a battery according to an embodiment of the present invention.
Figure 5:
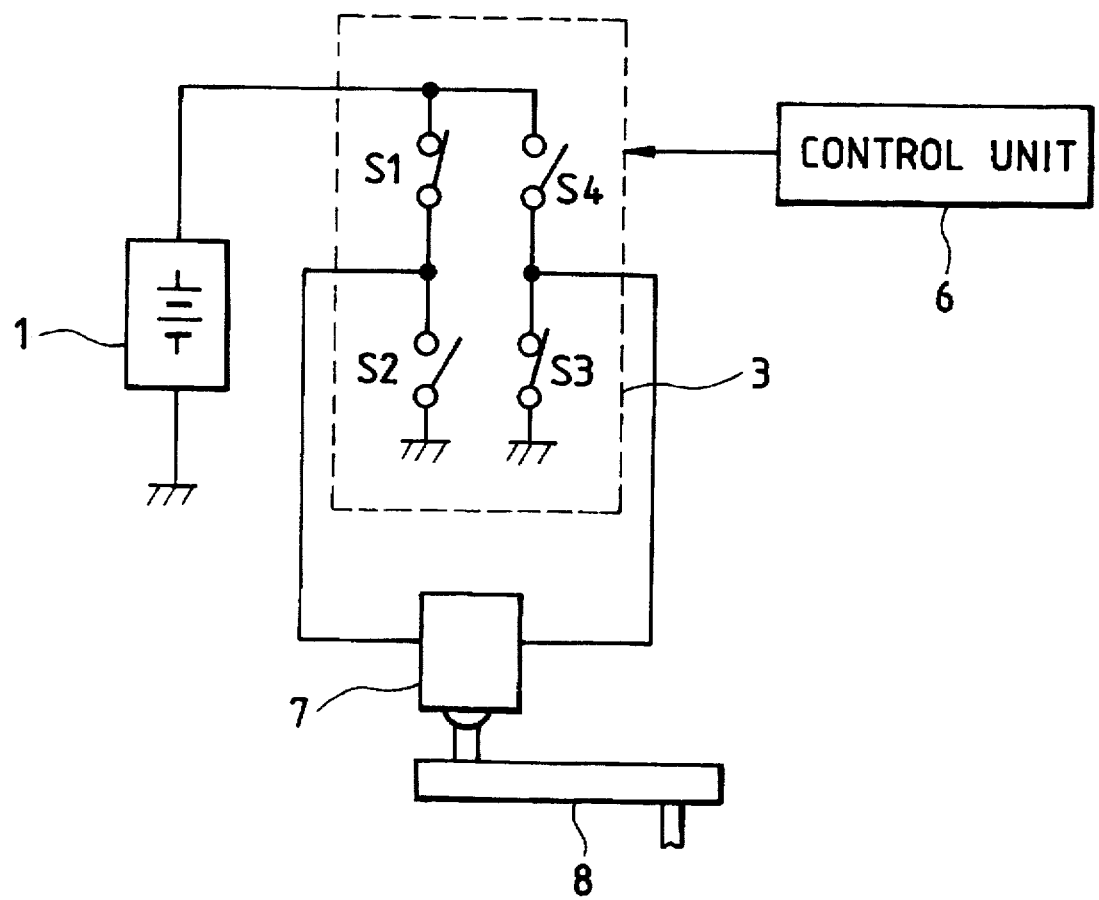
FIG. 5 is a block diagram showing an electrical arrangement of a conventional motor driver.

FIG. 1 is a block diagram showing an electrical connection of a motor driver powered by a battery according to an embodiment of the present invention. In FIG. 1, like elements and parts identical to those of FIG. 5 are marked with the same reference numerals or characters.

As shown in FIG. 1, roughly classified, the motor driver includes a battery 1, a DC/DC converter 2, a switch unit 3, a motor 4, a reduction unit 5 and a control unit 6. Arrangements of these blocks will be described below in detail.

The battery 1 supplies an operation voltage of a single-unit video camera-recorder and is of an enclosed type secondary battery that can be charged and discharged. To be more concrete, the battery 1 is a nickel-cadmium cell and an output voltage thereof is 6V.

The DC/DC converter 2 boosts a DC voltage of 6V supplied thereto from the battery 1 and an output voltage thereof is 9V. More specifically, the DC/DC converter 2 includes a boosting control circuit 21, a transistor Q, a coil L, a diode D, resistors R1 and R2 and a capacitor C.

The boosting control circuit 21 houses a reference voltage source, an error amplifier, a pulse width modulation (PWM) comparator and the like, though not shown. The boosting control circuit 21 is a well-known control circuit for controlling the operation of the boosting DC/DC converter 2 and controls a switching of the transistor Q based on the voltage divided by the resistors R1 and R2.

The transistor Q accumulates an energy in the coil L when it is placed in its on-state. The diode D transmits the energy accumulated in the coil L to the output side as a voltage. The capacitor C supplies a DC output by reducing a ripple component generated when the transistor Q is switched.

The DC/DC converter 2 is energized by the DC voltage of 6V supplied thereto from the battery 1 to generate a stabilized DC voltage of 9V. Then, the DC/DC converter 2 supplies the resulting DC voltage of 9V to the switch unit 3.

In accordance with command signals supplied from the control unit 6, the switch unit 3 operates in such three ways as to supply the DC voltage of 9V output thereto from the DC/DC converter 2 to the motor 4 in the form of inverted or non-inverted polarity and to stop the supply of the DC voltage of 9V to the motor 4. More specifically, the switch unit 3 is mainly composed of the four switches S1 through S4 connected in a bridge circuit fashion each formed of a transistor. The switch unit 3 opens connections of all of the switches S1 through S4, closes only connections of the switches S1 and S3 and closes only connections of the switches S2 and S4 in accordance with the command signals supplied thereto from the control unit 6.

The motor 4 is energized by an output voltage ranging from 7 to 7.5V input thereto from the switch unit 3 to generate a predetermined output. Specifically, the motor 4 is a loading motor for generating a drive power required when a video tape is loaded. Since the voltage input to the motor 4 falls in a range of from 7 to 7.5V, the motor 4 has the winding whose number of turns is properly matched with that input voltage. Therefore, the motor 4 can be driven at a low rotational speed to generate a predetermined output.

The reduction unit 5 houses a plurality of reduction gears and reduces a rotational speed of the motor 4 with a predetermined reduction ratio. The reduction unit 5 transmits a reduced rotation through an output shaft 51 to a video tape loading unit 9 (see FIG. 2) which will be described later on. The above-mentioned predetermined reduction ratio of the reduction unit 5 is not so large because the motor 4 can be driven at a low rotational speed. Thus, the reduction unit 5 has fewer stages of reduction gears.

The control unit 6 is mainly composed of a software that a microcomputer executes and controls a main operation of the single-unit video camera-recorder. The control unit 6 supplies command signals to the switch unit 3 to control the motor 4 operated when the video tape is loaded by the tape loading unit 9.

The tape loading unit 9 will be described more fully with reference to FIG. 2.

Figure 2:
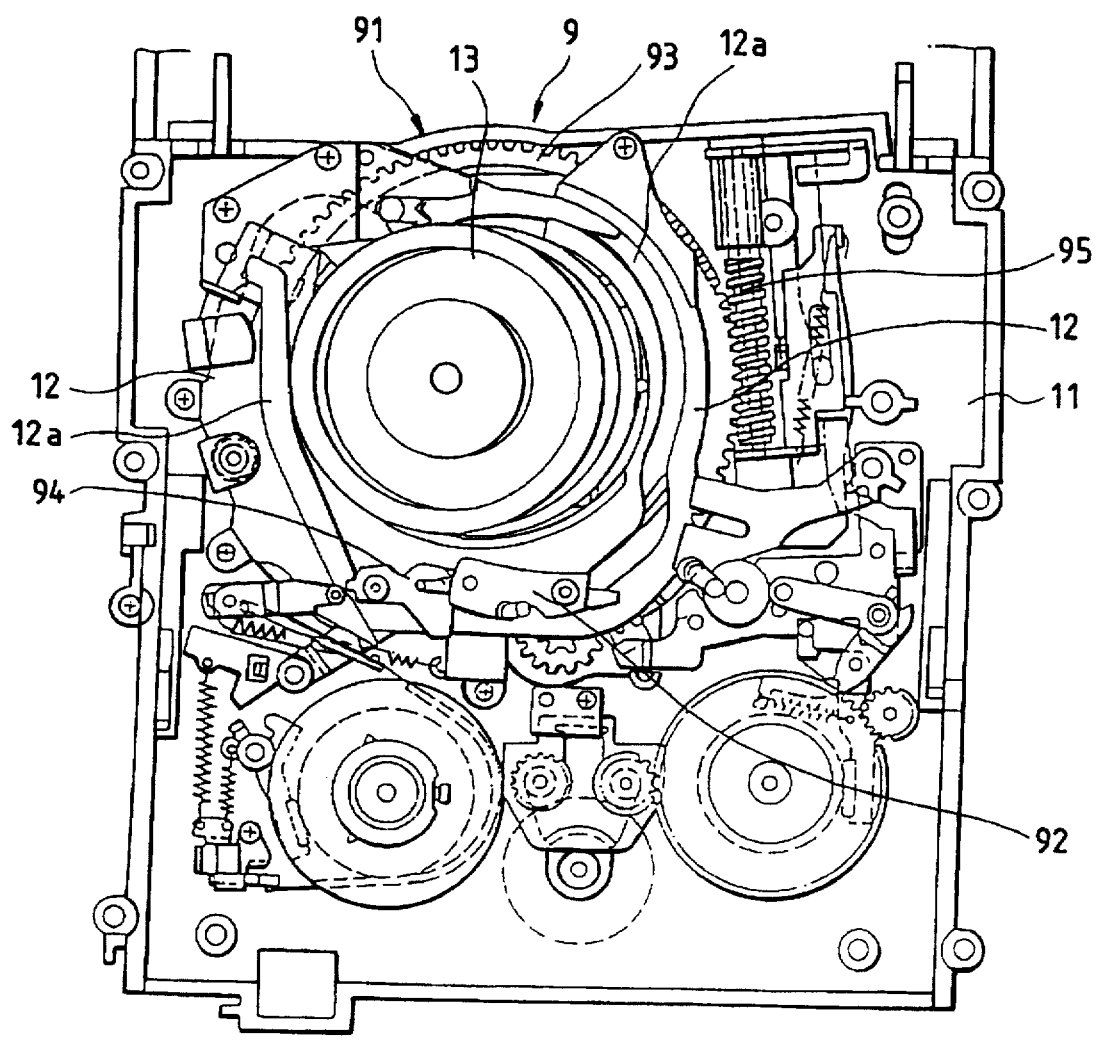
FIG. 2 is a plan view showing a chassis having a loading unit attached thereto.

As shown in FIG. 2, the tape loading unit 9 is provided on a chassis 11 integrally formed with a ring gear installing portion consisting of a concave portion inclined at a predetermined angle. A lower ring gear 91 is fitted into the ring gear installing portion and an upper ring gear 93 is assembled on the lower ring gear 91.

Figure 3:
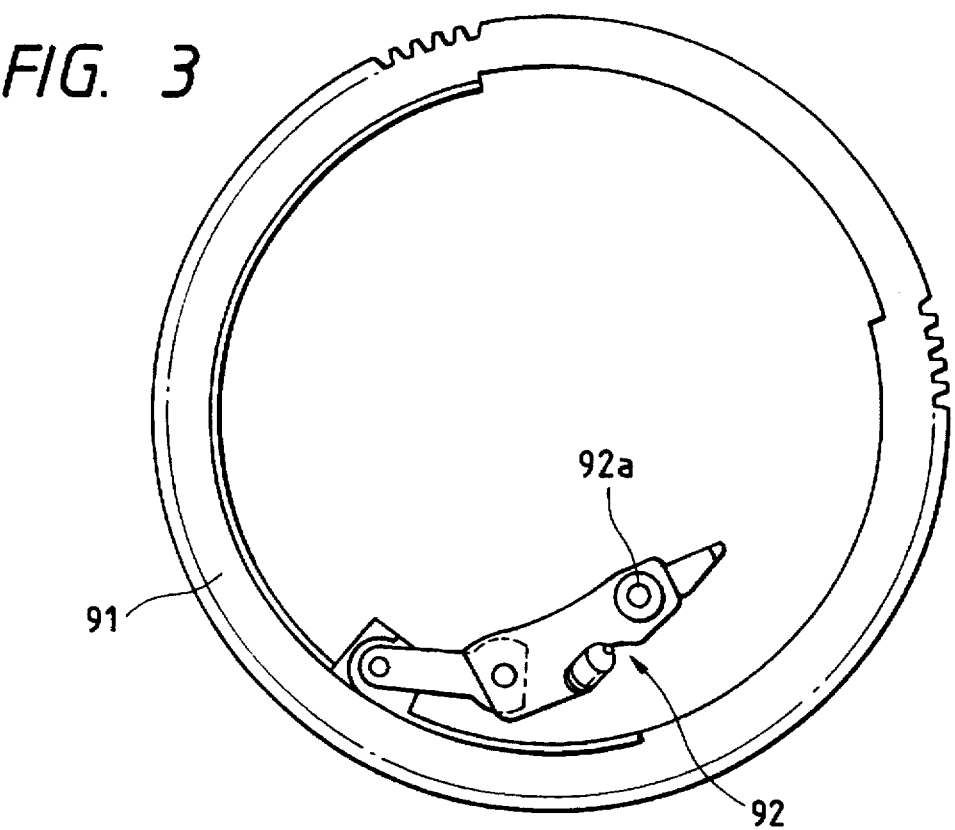
FIG. 3 is a plan view showing an arrangement of a lower ring gear.
Figure 4:
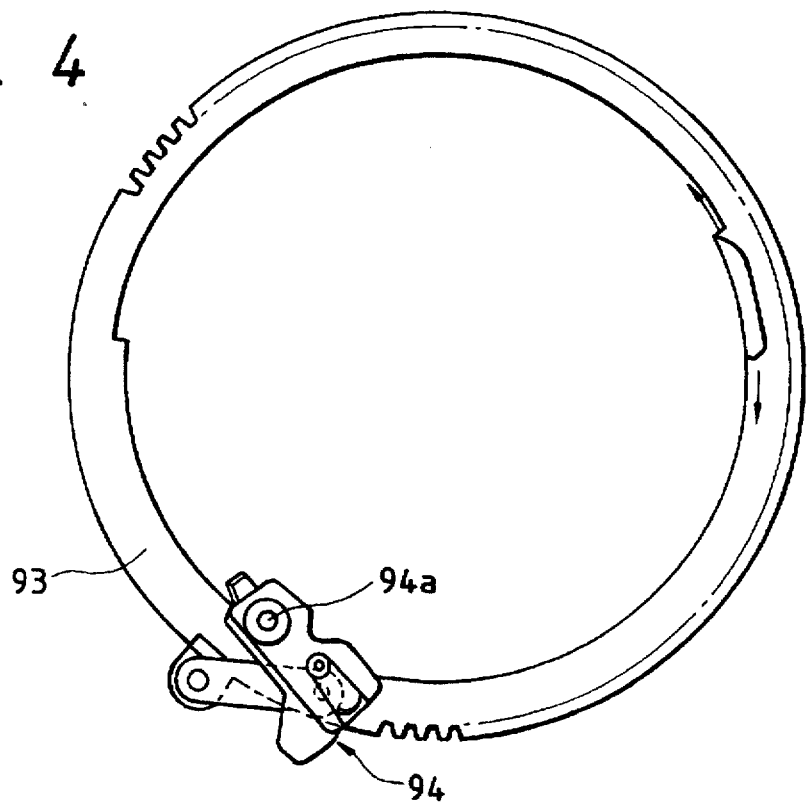
FIG. 4 is a plan view showing an arrangement of an upper ring gear.

As shown in FIGS. 3 and 4, a tape guide assembly 92 is joined to the lower ring gear 91 and a tape guide assembly 94 is joined to the upper ring gear 93 through links, respectively. A driving force of the motor 4 is transmitted through the reduction unit 5 to a worm 95 to rotate the lower ring gear 91 and the upper ring gear 93. When the video tape is loaded by the tape loading unit 9, for example, the lower ring gear 91 is rotated in the counter-clockwise direction and the upper ring gear 93 is rotated in the clockwise direction and the tape guide assemblies 92 and 94 are guided along guide grooves 12a of guide rails 12 to cause guide rollers 92a and 94a to operate to wind the video tape around a rotary head cylinder 13 at its predetermined position.

An operation of the motor driver thus arranged will be described below.

Referring back to FIG. 1, the DC voltage of 6V supplied from the battery 1 is boosted to a DC voltage of 9V by the DC/DC converter 2 and output to the switch unit 3, i.e., the DC voltage of 9V is supplied to the switch unit 3.

If an operation stop command signal is supplied to the switch unit 3 from the control unit 6, then the switch unit 3 opens connections of all switches S1 through S4. If the control unit 6 supplies a loading command signal to the switch unit 3 in order to effect the recording, then the switch unit 3 closes connections of the switches S1 and S3 to rotate the motor 4 in the positive direction. While the motor 4 is rotated in the positive direction, the voltage supplied to the switch unit 3 is 9V and a voltage drop of each of the transistors constructing the switches S1 and S3 is about 0.7V with the result that the motor 4 is driven by an operation voltage of about 7.5V (i.e., voltage a little less than twice the voltage supplied before being boosted). Accordingly, the motor 4 can be driven at a low rotational speed by the drive voltage of 7.5V to generate a predetermined output. The noise generated by the motor 4 when the motor 4 is driven is therefore not only reduced but also included in a low frequency range.

The output generated by the motor 4 is supplied to the reduction unit 5, in which it is reduced in rotational speed and then transmitted through the output shaft 51 to the tape loading unit 9 to load the video tape onto the predetermined position. The noise generated by the tape loading unit 9 is negligible in absolute amount because the motor 4 is driven at a low rotational speed and the reduction ratio of the reduction unit 5 is small. Moreover, the noise is included in a low frequency range and most of the noise becomes inoffensive to the ear, i.e., the user can be protected from being annoyed by the offensive noise generated when the video tape is loaded by the tape loading unit 9.

If the operation stop command signal is supplied to the switch unit 3 from the control unit 6 after the loading operation of the video tape has been finished, the switch unit 3 opens connections of the switches S1 and S3 to deenergize the motor 4.

Also, if an unloading command signal is supplied to the switch unit 3 from the control unit 6, the switch unit 3 closes connections of the switches S2 and S4 to rotate the motor 4 in the reverse direction. The video tape can be unloaded by the tape loading unit 9 very quietly and the user can substantially be protected from being annoyed by the noise similarly to the case that the video tape is loaded by the tape loading unit 9. Then, when the operation stop command signal is supplied to the switch unit 3 from the control unit 6 after the unloading operation of the video tape by the tape loading unit 9 has been ended, the switch unit 3 opens connections of the switches S2 and S4 to deenergize the motor 4.

The motor driver powered by a battery according to the present invention includes the DC/DC converter for boosting the DC voltage supplied thereto from the battery and the switch unit for controlling a connection between the output of the DC/DC converter and the motor. Accordingly, the motor is driven by a high operation voltage and the motor can be rotated at a low rotational speed to generate the predetermined output. As a consequence, it becomes possible to reduce the noise generated by the motor when the motor is driven. Moreover, inasmuch as the noise is included in the low frequency range, the noise becomes substantially inoffensive to the ear.

Furthermore, the reduction ratio of the reduction unit is reduced as the rotational speed of the motor is lowered, i.e., the number of stages of the reduction gears is decreased. Therefore, it becomes possible to simplify the arrangement of the reduction unit. Also, it becomes possible to reduce the noise generated by the reduction unit.

What is claimed is:

1. A driver for driving a loading motor of a single-unit video camera-recorder, comprising:

a battery;

a DC/DC converter for boosting and outputting a DC voltage supplied from said battery;

a switch unit having a predetermined voltage loss for switching a polarity of the DC voltage received from and boosted by said DC/DC converter; and a loading motor to which the boosted DC voltage from said DC/DC converter is supplied through said switch unit, said loading motor being provided with a reduction unit for reducing a rotational speed of said loading motor at a predetermined reduction ratio;

said DC/DC converter boosting said DC voltage by an amount corresponding substantially to said voltage loss.

2. The driver according to claim 1, wherein said battery is a nickel-cadmium cell.

3. The driver according to claim 1, wherein said switch unit includes four switches connected in a bridge circuit fashion, each of said switches being formed of a transistor.

4. The driver according to claim 1, wherein the number of turns of winding of said loading motor corresponds to the boosted DC voltage supplied from said DC/DC converter through said switch unit.

5. The driver according to claim 1, further comprising a control unit for supplying to said switch unit command signals to switch the polarity of the boosted DC voltage.

* * * * *